Dec. 30, 1958 H. A. BING ET AL 2,866,380
PHOTOGRAPHIC COPYING APPARATUS
Filed Dec. 11, 1957 5 Sheets-Sheet 1

United States Patent Office 2,866,380
Patented Dec. 30, 1958

2,866,380

PHOTOGRAPHIC COPYING APPARATUS

Herbert A. Bing, Wellesley, Vaito K. Eloranta, Needham, and David S. Grey, Lexington, Mass., and Karl Maiershofer, Norridge, Ill., assignors to Polaroid Corporation, Cambridge, Mass., a corporation of Delaware Application December 11, 1957, Serial No. 702,068

17 Claims. (Cl. 88—24)

This invention relates to photographic apparatus and, more particularly, to apparatus adapted to be coupled with a camera for photographically reproducing sheet subject matter.

Recent advances in photography have made it possible to obtain high-quality positive photographic prints directly in a camera by a diffusion-transfer reversal process. This is accomplished without the production of a negative which can be utilized to make additional prints of acceptable quality by conventional printing methods. Accordingly, copies are now made from the positive print by reversal techniques or by making an intermediate negative. While these methods are essentially satisfactory, the copies made from the original prints are not of an equivalent quality and the production of such prints requires considerably more skill and equipment and effort than the average person possesses or can afford. These advances in photography have also resulted in photographic materials which may be utilized to produce a positive transfer print directly in the camera which is a reproduction of another positive photographic print and is of substantially equal or even better quality.

The present invention has, as an object, the provision of a novel portable copying device adapted to be coupled with a camera, preferably of the so-called self-developing type, for making high-quality reproductions of sheet subject matter, preferably positive photographic prints.

Other objects of the invention are: to provide a novel copying device including means for mounting a photographic print, means for illuminating the print and means for mounting a camera for photographing the print; and to provide a device as described which is inexpensive to make and assemble, is compact in its construction and is simple, yet reliable, in its operation.

A further object of the invention is to provide a copying device as described which may be easily and accurately adjusted for use with a particular camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Generally, the apparatus of the invention comprises a portable device including means for supporting and properly positioning sheet subject matter, particularly a photographic print, to be reproduced or copied, means for illuminating the photographic print so that it can be photographed, means for mounting and securing a camera in predetermined relation to the photographic print and auxiliary lens means adapted, when coupled with the camera lens, to provide the proper optical system for photographing the subject print.

In reproducing photographs, it is desirable that the margins of the reproduction coincide with the margins of the original in order that the entire photograph be reproduced faithfully. Since different cameras of the same model and type may vary dimensionally, it will usually be necessary to make adjustments in the relative positions of the original print and the camera in order to be able to reproduce the original with optimum exactness. The copying device of the invention is so constructed as to permit these adjustments to be made easily and accurately for any particular camera of the type with which the device is adapted to be employed so that, thereafter, the camera and device can be employed together with assurance of good results.

The apparatus of the invention comprises a container or case, designated 10, which is adapted to mount and house all the components of the apparatus in a convenient and compact assembly, and is preferably provided with a suitable carrying handle to make it easily portable. Generally, the casing comprises a plurality of component sections, the majority of which are designed for formation from molded plastic materials, and are so constructed that they can be readily assembled together in the form of a container having upper, lower, forward, rear and side walls. Case 10, in the form shown, comprises a unitary upper section 12 including an upper wall having a recessed central panel 14 and two side panels 16 located on opposite sides of the central panel, and a dependent upper rear wall 18, upper forward wall panels 20 and upper side wall panels 22. A unitary lower casing section or base 24 provides a lower wall for the case. Lower rear wall panels, designated 26, which point with upper rear wall 18 to form a rear wall for the case, are provided by first casing sections, designated 28 and 30. These casing sections also provide rear panels 32 comprising lower side walls for the case. The remaining or forward panels 34 of the lower side walls, together with lower forward wall panels 36, are provided by a pair of second casing sections, designated 38.

The rear wall of the case is provided with a generally rectangular opening 40 bounded by upper rear wall 18, base 24 and lower rear wall panels 26. A rear door 42 pivotally mounted at its lower portion adjacent base 24 is provided for closing opening 40. The forward wall of the case is also provided with an opening 44 bounded by upper forward wall panels 20, base 24 and lower forward wall panels 36. A forward door 46 is provided pivotally mounted at its lower edge adjacent base 24 for closing opening 44. Door 42, when in a closed position, is engaged within rear opening 40 while door 46 in its closed position extends upwardly across the front of opening 44 between lower forward wall panels 36 and across a central rearwardly recessed panel 20a of upper forward wall 20. Rear door 42 is pivotally mounted on an elongated bar or rod 48 at its ends in base 24 and located in an elongated channel 50 in the lower portion of door 42 and extending the full width thereof so that the entire door can be readily removed by pivoting it through approximately 180° from its closed position. As a means for holding rear door 42 in its closed position, there are provided a pair of leaf springs 52 secured to base 24 so as to project into recesses 54 in the forward surface of the door and coact therewith.

Figures 1, 7:
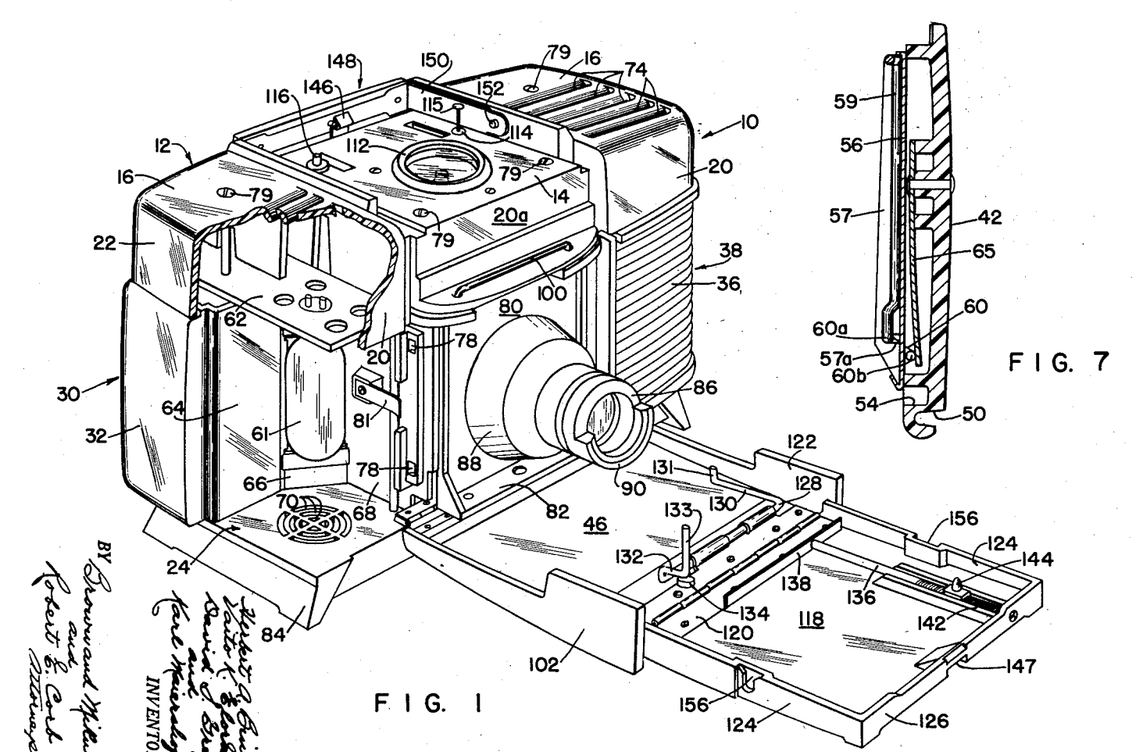
Figure 1 is a perspective view, partially in section with parts broken away, of apparatus embodying the invention, said apparatus being shown in an operative position.
Fig. 7 is a fragmentary, sectional view of a portion of the apparatus taken along the line 7—7 of Fig. 6.
Figure 2:
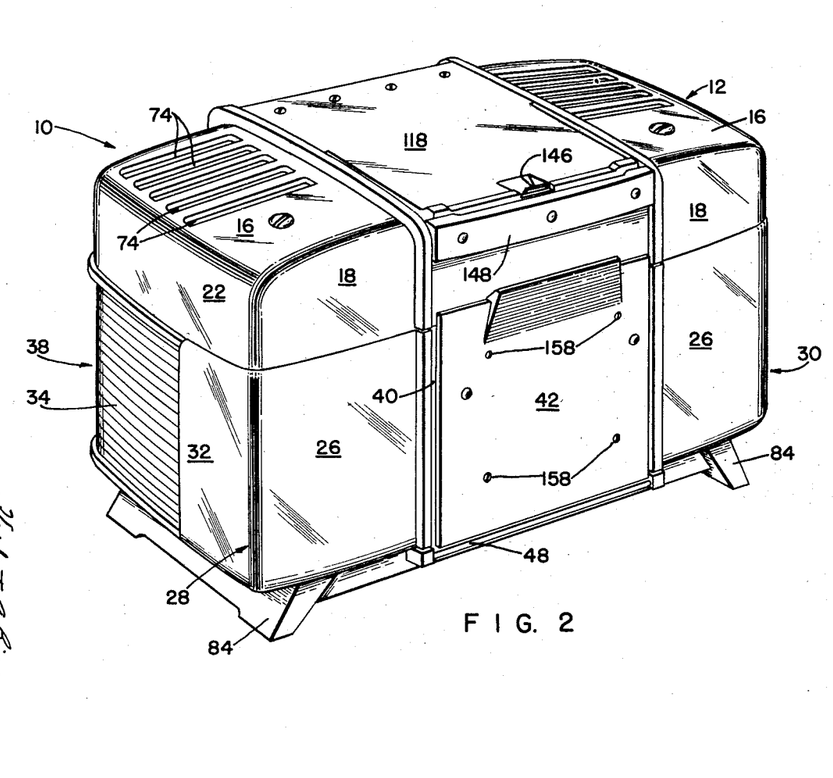
Fig. 2 is a perspective view of the apparatus of Fig. 1, taken from a different point of view to show the opposite side of the apparatus.
Figures 3, 4:
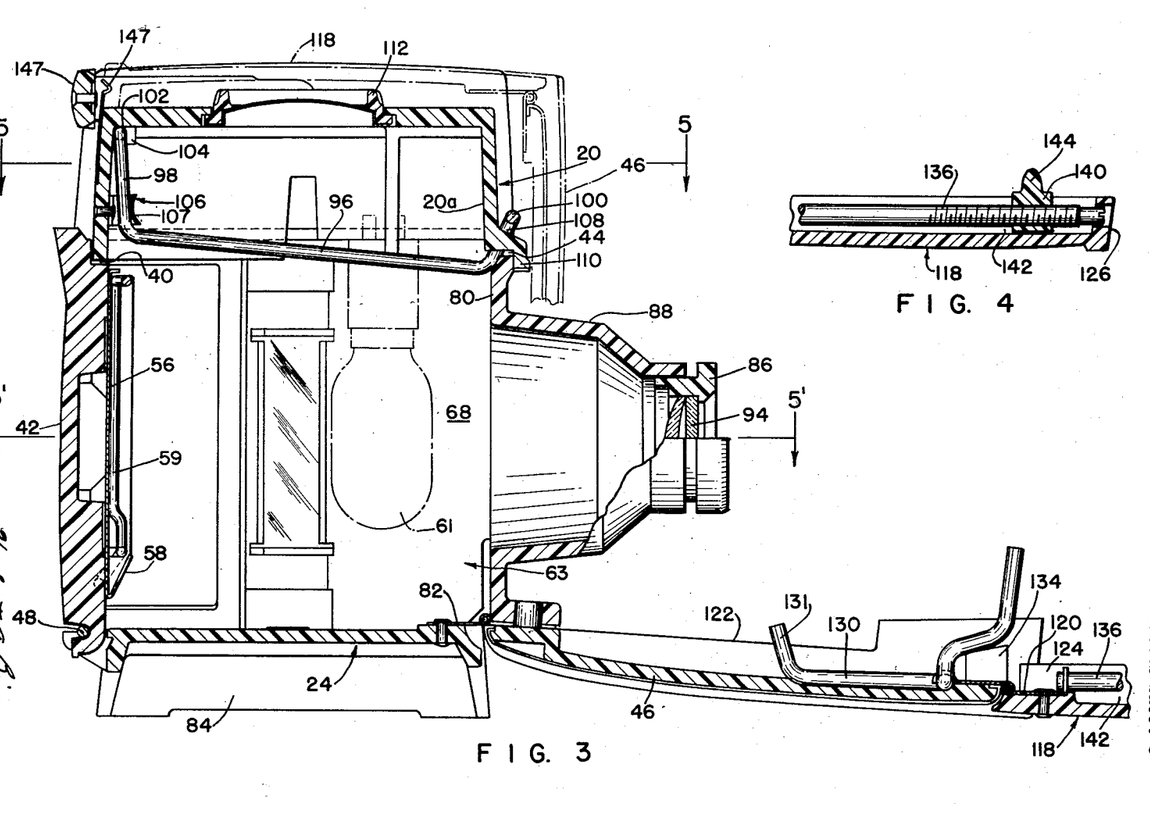
Fig. 3 is an elevational view of the apparatus shown in section, taken substantially midway between the sides of the apparatus.
Fig. 4 is a view showing a fragmentary portion of the apparatus of Fig. 3.
Figure 5:
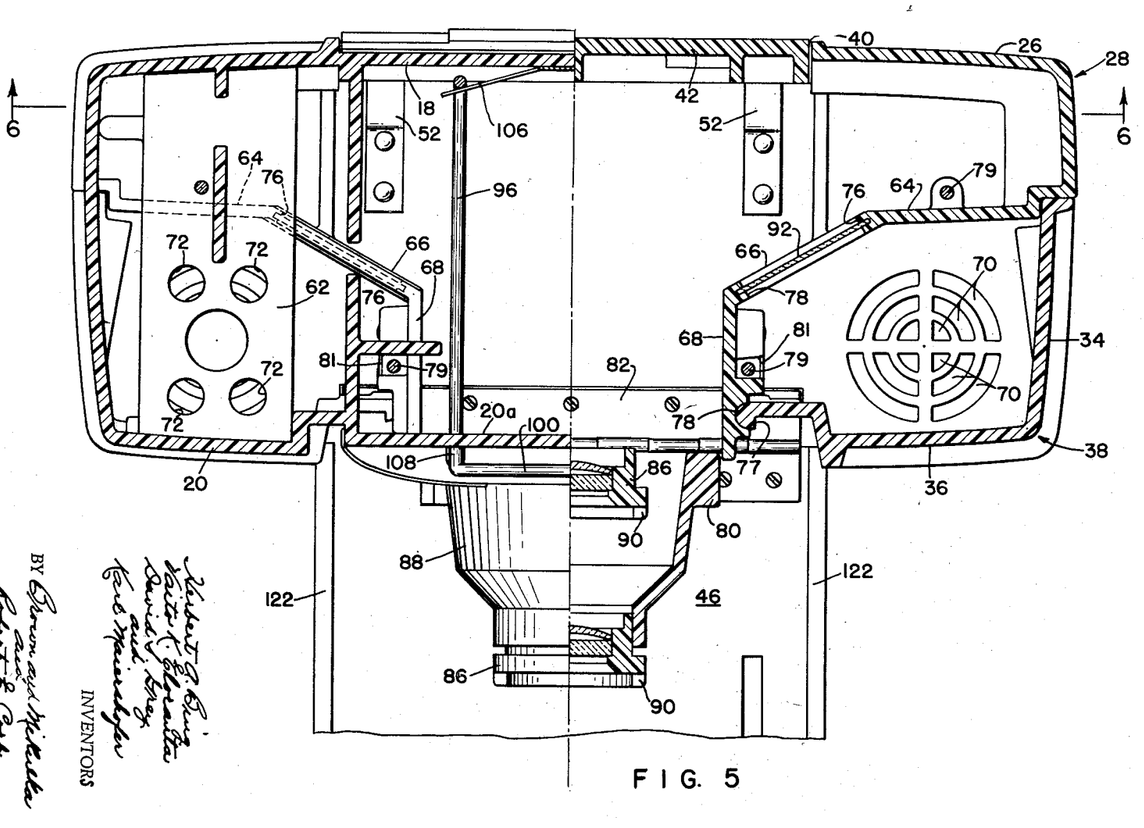
Fig. 5 is a plan view of the apparatus, each half thereof being shown in a different section, one being taken along the line 5—5 of Fig. 4, the other being taken along the line 5'—5' of Fig. 4, both sides of said apparatus being substantially symmetric.
Figure 6:
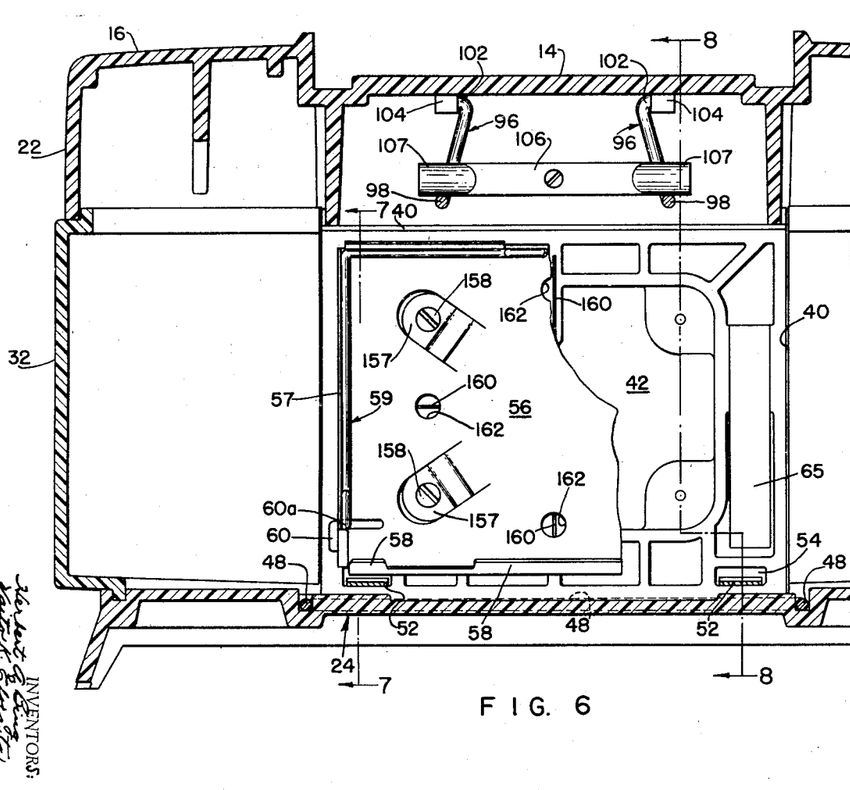
Fig. 6 is a fragmentary, elevational view of the apparatus shown in section, taken along the line 6—6 of Fig. 5.
Figure 8:
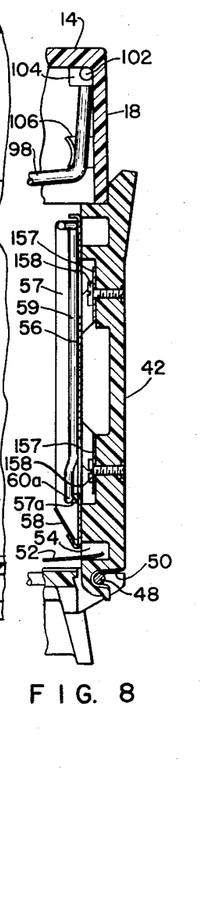
Fig. 8 is another fragmentary, sectional view of a portion of the apparatus taken along the line 8—8 of Fig. 6.

The device includes means for positioning sheet material, particularly a photographic print, for exposure so that it can be photographically reproduced. This means comprises a rear door 42 and means on the rear door for holding a print comprising a frame or plate 56 mounted on the inside or forward surface of door 42. Plate 56 is generally rectangular and includes forwardly extending flanges 57 at its lateral margins and bent-up flange sections 58 forming channels at its lower edge for engaging the lower and side edges of a print for locating the print on the door. As a means for retaining the print against plate 56, there is provided a generally U-shaped clamp member 59 comprising a wire frame adapted to engage a print mounted on plate 56 along the upper and lateral edges of the print. Clamp member 59 includes two arms having generally U-shaped end sections 60 comprising outwardly extending intermediate portions 60a at which the clamp is pivotally mounted in slots 57a in lateral flanges 57 and inwardly extending end portions 60b which underlie plate 56 in recesses in the inner surface of door 42. Spring means are provided for biasing clamp 59 against plate 56 and, in the form shown, comprise a pair of cantilever leaf springs 65 mounted on door 42 between the door and plate 56 so as to extend within the recess in the door surface into engagement with end portions 60b, urging clamp member 59 in a clockwise direction, viewing Fig. 7.

The copying apparatus of the invention includes means for properly illuminating a photographic print mounted for exposure on plate 56 so that the print can be photographed. This illumination means comprises a pair of lamps 61 mounted base uppermost on support members 62 within case 10 in the corners defined by lower side and forward wall panels 34 and 36 of second casing sections 38. Each lamp 61 is mounted in a chamber 63 defined by panels 34 and 36, base 24, support member 62 and an inner rear wall 64, an inner oblique wall 66 and an inner side wall 68, all comprising one of first casing sections 28 and 30. Inner rear walls 64 are located generally parallel with the front and rear walls of the casing, inner side walls 68 are disposed substantially at right angles thereto and inner oblique walls 66 join inner walls 64 and 68 and are disposed in planes located at an angle with respect to walls 64 and 68. Support members 62 are mounted on the upper portions of inner walls 64, 66 and 68 and on inwardly projecting flanges on the upper portions of the lower, side and rear wall panels between said inner walls and said wall panels, and downward projections on upper wall panels 16. In order to provide for air circulation around the lamps, base 24 includes openings 70 underlying the lamps, support members 62 are provided with openings 72 and upper wall side panels 16 are provided with louvres 74. Oblique inner walls 66 include openings 76 through which light from lamps 61 is transmitted to a print positioned for exposure on rear door 42. As a means for providing ready access to lamp chambers 63, second casing sections 38 comprising wall panels 34 and 36 are pivotally mounted on lower forward wall panels 36 and inner walls 68. The means for pivotally mounting sections 38 comprise tabs or projections 77 on lower forward wall panel 36 pivotally seated in recesses 78 in inner walls 68 and retained in the recess by leaf springs 81 secured to inner wall 68 and extending into recesses in lower forward wall panels 36. Springs 81 also function to urge second casing sections 38 into closed position.

The various sections of case 10, namely upper section 12, lower section 24, first casing sections 28, second casing sections 38 and lamp support members 62, are all retained together by four elongated bolts 79 secured between upper section 12 and base 24.

As previously noted, the copying apparatus includes a lens means adapted to be coupled with the lens of a camera for producing an optical system suitable for photographing a print of predetermined size positioned at a predetermined distance. This lens means comprises an assembly mounted on a support panel 80 secured at its lower edge to forward door 46 adjacent the rear or lower edge of the door and in a plane substantially perpendicular to the plane of the door. Forward door 46 is pivotally secured to lower casing section 24 by a hinge 82 and is so arranged with respect to lens support panel 80 that, when the door is closed, panel 80 is located within the case adjacent base 24 and, when the door is pivoted through approximately 90° to an open position, is located in closing relation in opening 44.

The apparatus of the invention is intended to be employed while resting on a substantially flat surface such as a tabletop or the like. Base 24 includes a pair of downwardly and outwardly projecting support flanges 84 at its ends on which the case itself rests. Forward door 46 is so constructed as to pivot through approximately 90° from its closed position to an open position wherein it rests on the same surface as case 10. In this open or operative position, lens support panel 80 is so positioned that the lens assembly supported thereon is located with its optic axis substantially perpendicular to the plane of frame 56 (when door 42 is in closed position). The lens assembly, designated 86, may be mounted on panel 80 or on a cone 88, as shown, adapted to project forwardly from panel 80, depending on the physical dimensions of the camera and the optics to be used. The lens assembly includes a half collar 90 at its forward end surrounding the lower half of the lens and adapted to engage and properly locate the lens assembly of the camera in combination with which the copying apparatus is employed.

It is well known that light falling upon a subject is reflected as two components, termed "specular" and "diffuse." The specular component produces what is known as gloss and reflects an image of the light source. The diffuse component is reflected in all directions and does not reflect an image of the light source. It is desirable in photographic copying to prevent the specular component from reaching the photosensitive material in a copying camera and at the same time to permit the diffuse component to reach said material without appreciable attenuation. This desired result is accomplished in the preferred copying apparatus by polarizing elements or sheets. A first polarizing element polarizes light from the illuminating source falling on the print being copied. The specular component of this light remains polarized when reflected by the object and is absorbed by a second polarizing element positioned between the print and the photosensitive material with its transmission axis at right angles to the transmission axis of the first polarizing element.

In the form of apparatus shown, a pair of first polarizing elements comprise sheets of polarizing material or filter elements, designated 92, secured in openings 76 in inner oblique walls 66. A second polarizing element 94 is provided in lens assembly 86 with its transmission axis oriented substantially at right angles to the transmission axis of first polarizing elements 92. In this manner light from lamps 61 is polarized when passing through first polarizing elements 92 and strikes the surface of a print secured in frame 56, the polarized light striking the print being reflected as two components, the specular component being polarized and the diffuse component being unpolarized. The polarized specular component reflected from the print is absorbed by second polarizing element 94. Although a portion of the diffuse component is absorbed by second polarizing element 94, the major portion of the diffuse component is transmitted by second polarizing element 94 and reaches the lens of the camera with which the apparatus is associated.

Means are provided for retaining lens support panel 80 in its operative position and, in the form shown, comprise a generally U-shaped locking member 96 formed of a relatively stiff wire and having two lateral arms 98 and a connecting element 100. The free end portions 102 of arms 98 are turned outwardly away from one another so that they are in alignment and provide means for mounting locking member 96 for limited pivotal movement on upper rear wall 18. A mounting pair of bosses 104 on the inside of the upper rear wall are provided for pivotally mounting locking member 96. Arms 98 extend substantially parallel to one another downwardly and then forwardly to points just above the upper edge of opening 44 in the front wall where portions of said arms, designated 108, are bent upwardly so as to project through openings in recessed section 20a of upper forward wall 20. Connecting element 100 extends across the front of recessed section 20a and is manually engageable whereby the locking member can be pivoted about end portions 102. A leaf spring 106 having end portions 107 is secured to upper rear wall 18 so that end portions 107 coact with arms 98 for pivoting locking member 96 so that the arms, in the region of connecting element 100 and bent portions 108, are urged toward base 24. The bent portions 108, where said arms turn upward and project through recessed panel 20a, extend into the path of pivotal movement of the upper edge portion of lens support panel 80 into operative position wherein said upper edge portion is located adjacent the inner surface of a downwardly extending flange 110 on recessed panel 20a. As the support panel is pivoted into operative position, it engages bent portions 108, deflecting them upwardly so that the upper edge of the support panel becomes engaged by the bent portions 108 and flange 110 in the operative position of the support panel. The support panel can be released for movement to an inoperative position by manually pivoting locking member 96 upward, connecting element 100 being employed for this purpose.

The apparatus of the invention includes accessories and controls such as a timer 112, a receptacle 114 for storing a cable release 115 and a switch 116 for the lamps. The timer, receptacle and switch are all mounted in central panel 14 of upper section 12. A cord for the lamps and the timer, which is preferably electrically operated, projects through an opening in base 24 and for convenience may be stored by coiling it around support flanges 84 which are flared outwardly for this purpose.

Means are provided for mounting a camera on the apparatus in a predetermined position relative to frame 56 in which a print to be copied is retained. This means comprises forward door 46 and a camera support panel 118 pivotally attached to the upper edge portion of forward door 46 by a hinge 120. Camera support panel 118 is adapted, when in its operative position, to be supported on the same support surface as forward door 46 in substantially the same plane as the door. In the inoperative or closed position of the forward door and support panel 118, the latter is located on top of the casing and extends across central panels 14 in the recess provided thereby between upper wall side panels 16, and in this position provides a cover for timer 112, cable release 115 in receptacle 114 and switch 116.

Forward door 46 includes lateral flanges 122 and camera support panel 118 includes lateral flanges 124 and an end flange 126 on its outer edge opposite hinge 120. Depending on the particular camera with which the device is to be used, lateral flanges 122 or 124 provide means for supporting the camera with the optic axis of the camera lens in substantially the same horizontal plane as the optic axis of lens assembly 86. Also, depending on the camera adapted to be employed with the apparatus, either door 46 or support panel 118 is provided with means for engaging the camera and positioning it with the lens thereof against lens assembly 86 and with its optic axis in the vertical plane of the optic axis of lens assembly 86 whereby the axes of the two lenses are in alignment. This last-mentioned means may comprise a wire member or rod 128 pivotally mounted on hinge 120 and includes a generally L-shaped arm 130 extending substantially perpendicularly from one end of rod 128 adjacent one of flanges 122 and toward lens assembly 86. Arm 130 includes an upturned end section 131 adapted to engage and support a portion of the camera body. Member 128 includes another substantially L-shaped arm 132 at its opposite end projecting away from lens assembly 86 and having an upwardly extending end section 133 for engaging a rear edge of the camera housing. A resilient button 134, formed of rubber for example, is provided for supporting arm 132 and, being resilient, allows for slight variations in the position of member 128.

Another form of retaining means is shown mounted on camera support panel 118. This means comprises a threaded screw 136 rotatably mounted at one end on a support bracket 138 turned up from hinge 120 and at its other end in end flange 126. Mounted on screw 136 in engagement with the threads thereof is an engagement member 140 having a lower portion seated in a recess 142 in panel 118 so that the engagement member cannot rotate, but is free to move along the axis of the screw. Engagement member 140 includes an upstanding pin 144 adapted to project into the tripod receptacle of a camera. The position of engagement member 140 can be varied by rotating screw 136, the latter being provided with a slotted head for this purpose so that, when a particular camera is located in operative position, the lens thereof is engaged in collar 90 and pin 144 is engaged in the tripod socket of the camera.

Case 10 is provided with a carrying handle 148 having two dependent arms 150 secured at their ends to pins 152 pivotally engaged in upper wall side panels 16 and projecting toward one another into the recess provided by central panel 14. Handle 148 is pivotable between an upright, operative position, and an inoperative position wherein arms 150 are located against panel 14 with the connecting grip portion of the handle disposed at the rear of the casing above rear door 42. When camera support panel 118 is in its inoperative or closed position, arms 150 extend between panel 118 and upper wall side panels 16. Lateral flanges 124 of panel 118 are provided with recesses 156 into which the heads of the pins 152 can project when panel 118 is in closed position.

As a means for holding panel 118 in closed position, there is provided a resilient detent member 146 secured to rear wall 18 so as to engage panel 118 in a recess 147 provided therefor in the panel. Detent member 146 is manually deformable rearwardly for releasing panel 118 for movement from closed position. In a preferred form of the apparatus, switch 116 is of the push-button type, having a button which projects above central panel 14, and is depressed against a spring by engagement with camera support panel 118 when the latter is in a closed position, thereby providing means for springing the panel into a partially open position when the detent member is disengaged from the panel.

The arrangement of the housing, the forward and rear doors, camera support panel and lens support panel insures that the camera and its lens are properly located relative to the lens assembly of the apparatus and that all three, that is, the lens assembly of the apparatus, the lens of the camera and the camera, are properly located with respect to the plane of the print to be copied insofar as perpendicularity of the optic axes of the lenses is concerned and the distances between the camera lens and plane of the print. It is important in so-called one-to-one copying, that is, in producing a copy which is the same size as the original, that the center of the original and the center of the focal plane aperture of the camera be located on the optic axis of the lens system employed in order that the margins of the original and the copy will coincide. However, since there may be dimensional variations between cameras of the same type and specifically variations in the position of the center of the focal plane aperture of the camera, the copying apparatus of the invention includes simple and easily employed means for adjusting the apparatus for any particular camera in order to assure the required alignment for that camera. This means comprises mounting frame 56 on rear door 42 by screws 158 which project through enlarged openings in support elements 154 formed from frame 56 and are threaded into tapped holes in the door, thereby allowing for adjustment of the position of the frame sufficiently to obtain the proper alignment within the range of expected variations. Screws 158 include slotted heads on the inside of the door while the other ends of the screws are provided with slots accessible from the exterior of the door to allow for tightening of the screws. Suitable reference marks 160, which in the form shown comprise portions of a T position on its side, are provided on the inner surface of the rear door. Frame 56 is provided with openings 162 rendering reference marks 160 visible with the frame secured to the door. To properly position the frame for a particular camera, the operator merely photographs this reference mark on the door, then inserts the photograph in the frame and adjusts the position of the frame so that the image of the reference marks in the photograph is aligned with the reference marks on the door. Screws 158 are then tightened so that the frame cannot be moved.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic copying apparatus comprising, in combination, a generally box-like case having a first opening in one side, a first door for closing said opening, means on said first door for mounting sheet material to be copied in a predetermined plane, a second opening in said case in the side thereof opposite said first opening, second door means comprising first and second support panels arranged substantially at right angles with respect to one another, said second door means being mounted adjacent the intersection of said support panels for pivotal movement on said case between a first position, wherein said first support panel is located within said case and said second support panel is located in closing relation to said second opening, and a second position, wherein said first support panel is located in closing relation to said second opening and said first support panel comprises means for mounting a camera on said apparatus, a lens assembly mounted on said first support panel with its optic axis substantially perpendicular to said predetermined plane of a sheet mounted for copying on said first door when the latter is in closed position and said second door is in said second position, a third support panel pivotally secured to the edge of said second support panel which is opposite said intersection of said first and second support panels, said third support panel having an open position wherein it comprises said means for mounting a camera when said second door is in said second position, and a closed position wherein said third support panel is disposed against a wall of said case, and lamp means mounted within said case adjacent opposite sides of said second opening for illuminating a sheet mounted for exposure on said first door.

2. Photographic copying apparatus comprising, in combination, a generally box-like case having a first opening in one side, a first door for closing said opening, frame means for holding a sheet to be copied in a predetermined plane, means for so securing said frame means to the inside of said door that said frame means can be moved in said plane relative to said door and can be fixedly retained at a predetermined position in said plane, photographable reference indicia on the inside of said door with which a photographic print on said indicia mounted in said frame means can be aligned for properly locating said frame means with respect to the camera, mounted on said apparatus, with which said photograph was produced, a second opening in said case in the side thereof opposite said first opening, pivotable closure means for said second opening comprising means for mounting a camera on said apparatus, lens means mounted on said closure means adapted to be coupled with said camera for photographing a sheet mounted for exposure in said frame means, and lamp means mounted within said case adjacent opposite sides of said second opening for illuminating for exposure a sheet mounted in said frame means.

3. The apparatus of claim 2 wherein said closure means comprises first and second support panels arranged substantially at right angles with respect to one another, said lens means being mounted on said first support panel, said closure means being mounted adjacent the intersection of said panels for pivotal movement on said case between a first position, wherein said first support panel is located within said case and said second support panel is located in closing relation to said second opening, and a second position, wherein said first support panel is located in closing relation to said second opening and said first support panel comprises means for mounting a camera on said apparatus, said lens means being mounted on said first support panel with its optic axis substantially perpendicular to said predetermined plane of a sheet mounted for copying in said frame means when said door is in closed position and said closure means is in said second position.

4. The photographic apparatus of claim 3 wherein said closure means comprises a third support panel pivotally secured to the edge of said second support panel which is opposite said intersection of said first and second support panels, said third support panel having an open position, wherein it comprises said means for mounting a camera when said closure means is in said second position, and a closed position, wherein said third support panel is disposed against a wall of said case, and means for engaging said third support panel and releasably retaining said closure means in said first position and said third support panel in said closed position.

5. Photographic copying apparatus comprising, in combination, a generally box-like case having an upper wall, lower wall, forward and rear walls and side walls, a first opening in said rear wall, a rear door pivotally mounted on said case for closing said first opening, mounting means on said rear door for holding a sheet to be copied, a second opening in said forward wall, closure means for said second opening, lens means adapted to be coupled with a camera for photographing a sheet mounted for exposure on said rear door, said closure means comprising a first panel for mounting said lens means in operative relation to said rear door and a second panel comprising means for mounting said camera on said apparatus, intermediate wall panels within said case cooperating with panels of said forward and side walls for providing chambers within said case on opposite sides of said second opening, lamp means mounted within said chambers for illuminating a sheet mounted for exposure on said rear door, said upper wall and portions of said forward, rear and side walls comprising a first casing section, said lower wall comprising a second casing section, other portions of said rear and side walls and said intermediate wall panels comprising a third casing section, and said first-mentioned portions of said forward and side wall panels comprising a fourth casing section, said first and second casing sections being secured to one another and said third and fourth casing sections being retained between said first and second casing sections.

6. The photographic apparatus of claim 5 wherein said casing sections comprise moldings of plastic material.

7. The photographic apparatus of claim 5 wherein said fourth casing sections comprising said front and side wall panels are mounted for pivotal movement with respect to the other of said casing sections to provide access to said chambers.

8. The photographic apparatus of claim 5 wherein said intermediate wall panels comprising said chambers are provided with windows through which light from said lamps is transmitted to a sheet positioned for exposure on said rear door, light-polarizing filters are provided in said windows and a light-polarizing element, having its transmission axis arranged substantially at right angles to the transmission axes of said light-polarizing filters, is provided in said lens assembly so that the polarized component of light from said lamps reflected specularly from the surface of a sheet positioned for exposure on said rear door is prevented from being transmitted by said lens assembly.

9. Photographic copying apparatus comprising, in combination, a box-like case having an upper wall, a lower wall, forward and rear walls and side walls, a first opening in said rear wall, a rear door pivotably mounted on said case for closing said first opening, means on said rear door for holding a sheet to be copied, a second opening in said forward wall, closure means for said second opening, said closure means comprising first and second support panels arranged substantially at right angles to one another, said closure means being mounted adjacent the intersection of said support panels for pivotable movement on said case between a first position wherein said first support panel is disposed within said case and said second support panel is located in closing relation to said second opening, and a second position wherein said first support panel is located in closing relation to said second opening and said second support panel comprises said means for mounting a camera on said apparatus, means for engaging and releasably retaining said first support panel in said second position, a lens assembly mounted on said first support panel so that its optic axis is predeterminedly positioned with respect to the plane of a sheet mounted for copying on said rear door when the latter is in a closed position and said first support panel is in said second position, a third support panel pivotably secured to the edge of the second support panel which is opposite said intersection of said first and second panels, said third support panel having an open position wherein it comprises said means for mounting a camera and said closure means is in said second position, and a closed position wherein said third support panel is disposed and said upper wall of said case and said closure means is in said first position, lamp means within said case adjacent opposite sides of said opening for illuminating a sheet mounted for exposure on said rear door, and carrying means in the form of a handle pivotably mounted on said upper wall.

10. Photographic copying apparatus comprising, in combination, a case having a base, an upper wall, side walls, forward and rear walls, a first opening in said rear wall, a rear door pivotally mounted on said case for closing said first opening, means for urging said rear door into closed position, frame means on said rear door for holding a sheet to be copied in a predetermined plane, a second opening in said forward wall, a forward door pivotally mounted adjacent its lower edge on said base for closing said second opening, said forward door being pivotable from a closed position in closing relation to said second opening to an open position wherein it comprises means for mounting a camera on said apparatus, a first support panel mounted at one edge on said door adjacent said lower edge thereof and extending in a plane approximately perpendicular to the plane of said forward door, said first support panel being so mounted on said forward door that it is pivotable with said door between a first position wherein it is disposed within said case adjacent said base when said forward door is in closed position, and a second position wherein it is located in closing relation to said second opening when said forward door is in said open position, a lens assembly mounted on said first support panel, said lens assembly including means for engaging the lens assembly of said camera and having its optic axis substantially perpendicular to said predetermined plane of said sheet to be copied when said first support panel is in said second position, a second support panel pivotally secured to said forward door adjacent the edge thereof opposite said lower edge, said second support panel comprising said means for mounting said camera on said apparatus and having a folded position wherein it is disposed against the upper wall of said case when said forward door is in said closed position, and an operative position wherein it is located substantially in the plane of said forward door when the latter is in open position, means for releasably retaining said second support panel in its folded position against said upper wall, means for engaging said first support panel and retaining it in said second position, lamp means, means in the upper portion of said case for mounting said lamp means within said case adjacent said forward wall on opposite sides of said second opening so that light from said lamp means is incident on a sheet mounted for copying on said rear door, and openings in said base and said upper walls for providing air circulation around said lamp means.

11. The apparatus of claim 10 comprising means for so mounting said frame means on said rear door that the position of said frame means can be changed, and photographable reference indicia on the inside of said rear door with which a photograph of said indicia mounted in said frame means can be aligned for properly locating said frame means with respect to the camera with which said photograph was produced.

12. The photographic apparatus of claim 10 wherein said upper wall and portions of said forward, rear and side walls comprise a first casing section, said base comprises a second casing section, other portions of said rear and said side walls comprise a third casing section and a fourth casing section, portions of said forward wall comprising said fourth casing section, said first and second casing sections being secured to one another and said third and fourth casing sections being retained between said first and second casing sections.

13. The apparatus of claim 12 wherein said casing sections comprise moldings of plastic materials.

14. The apparatus of claim 12 wherein said fourth casing section includes panels comprising said front and side walls and are pivotable with respect to the other of said casing sections to provide access to the interior of said case.

15. The apparatus of claim 14 wherein said third casing section comprises inner wall panels cooperating with said side and forward wall panels comprising said fourth casing section to define chambers for said lamps, said inner wall panels having openings through which light from said lamps is transmitted to a sheet held in said frame, and said side and forward wall panels comprising said fourth casing section are mounted for pivotable movement with respect to the other of said casing sections for providing access to said lamp chambers.

16. The photographic apparatus of claim 10 wherein said lamps are mounted wtihin a pair of chambers within said case, said chambers include windows through which light from said lamps is transmitted to a sheet positioned for exposure in said frame, light-polarizing sheets are provided in said windows, and said lens assembly includes a light-polarizing element having its transmission axis arranged substantially at right angles to the transmission axes of said light-polarizing sheets, whereby the polarized component of light from said lamps reflected specularly from the surface of said sheet to be copied is prevented from being transmitted by said lens assembly.

17. The photographic apparatus of claim 10 wherein said upper wall comprises a recessed section, said second support panel in its folded position is located across said recessed section in the recess provided thereby, and a switch means is provided for said lamp means, mounted on said recessed section of said upper wall, said second support panel being adapted in its folded position to provide means for housing said switch means and other components of said apparatus which may be mounted on said recessed section.

No references cited.